July 23, 1968
S. W. KUCHLIN
3,394,388
CONTAINER, PACKAGE OR CARTON FOR COMESTIBLES
AND NON-EDIBLE PRODUCTS
Filed Feb. 15, 1966
2 Sheets-Sheet 2
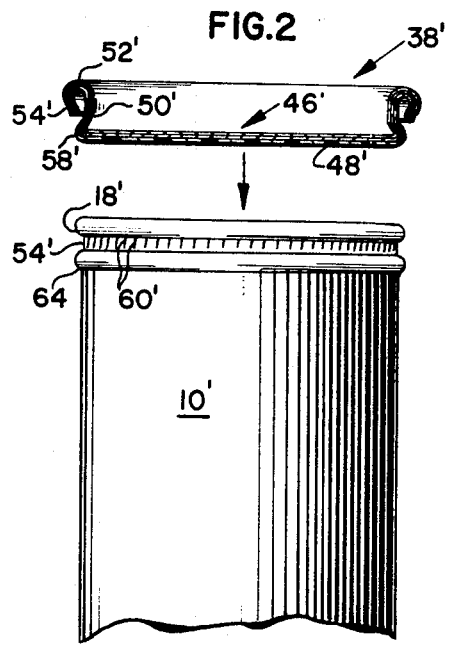
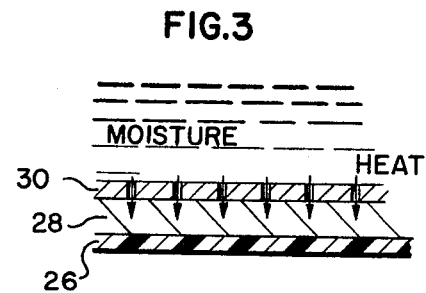
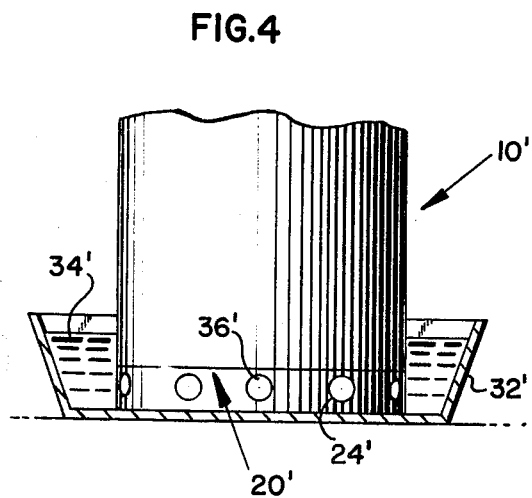
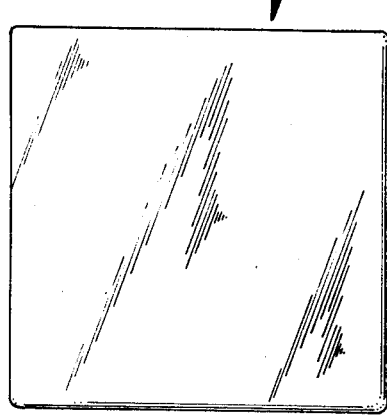
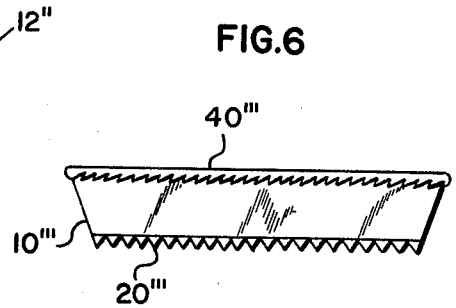
*INVENTOR.*
SANDER W. KUCHLIN
BY Rachenbach & Siegel
ATTORNEYS

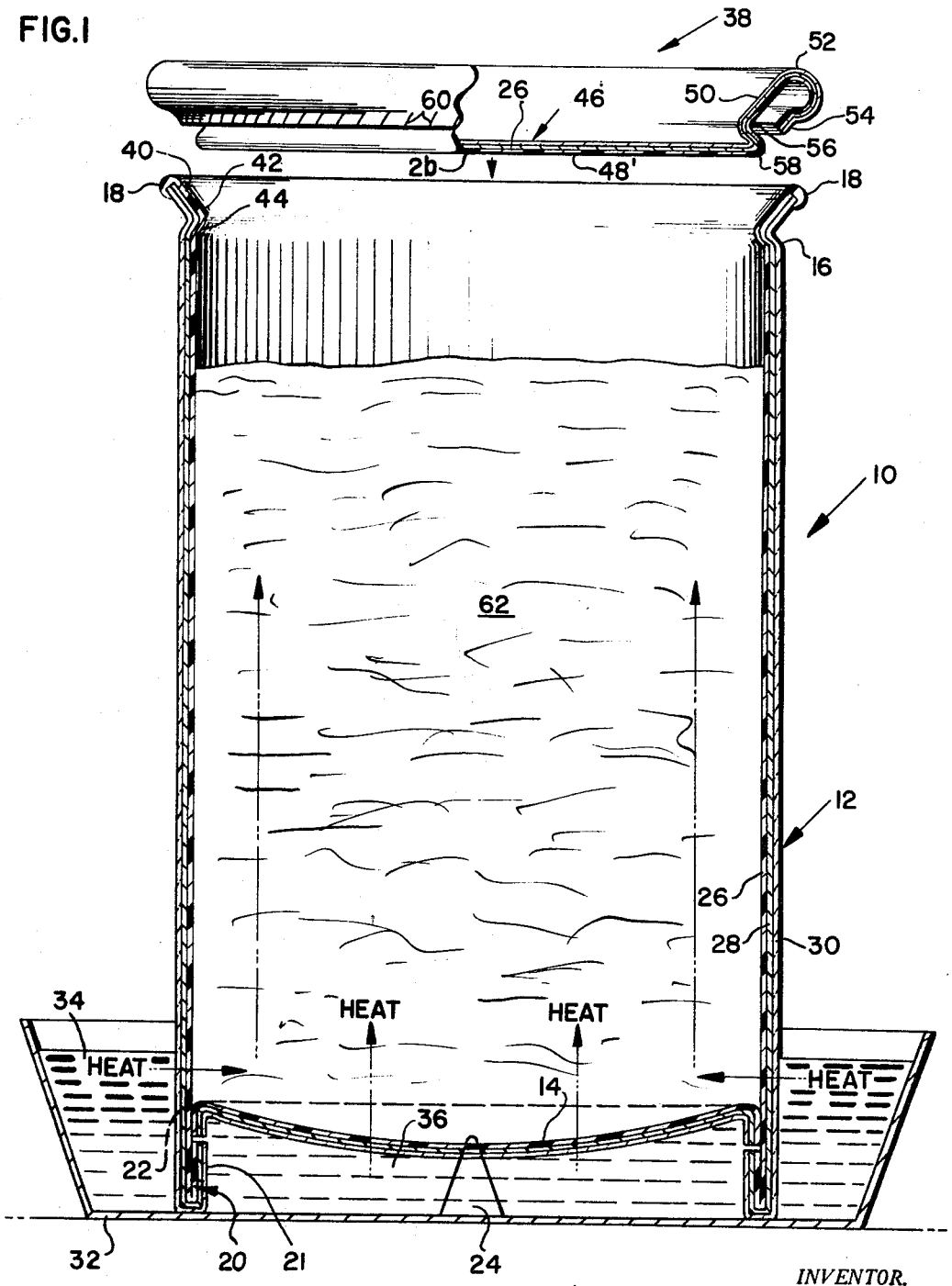

United States Patent Office 3,394,388
Patented July 23, 1968

3,394,388
CONTAINER, PACKAGE OR CARTON FOR COMESTIBLES AND NON-EDIBLE PRODUCTS
Sander W. Kuchlin, East Islip, N.Y., assignor to Notraco International Ltd., East Islip, N.Y., a corporation of New York
Filed Feb. 16, 1966, Ser. No. 527,930
11 Claims. (Cl. 229—14)

ABSTRACT OF THE DISCLOSURE

Non-metallic, air and moisture impervious, heat pervious and rigid container, package or carton structure suitable for use with edible and non-edible products of substantially any type or kind enabling the storage, freezing, serving, handling, and even heating of the products within the container by substantially any manner, including by electric field heating, water immersion heating, steam heating, dry heating, etc.

---

The present invention pertains, generally, to containers, packages or cartons for comestibles, and more particularly, to means for packaging, shipping, storing and displaying frozen prepared or unprepared comestibles of any kind or type, such as meats, vegetables, or the like, said means being constructed and arranged to enable any available construction, machine, apparatus or method capable of making the comestibles disposed therein ready for serving and consumption to be utilized.

Objects of the invention

A restaurant is presented with a number of very significant problems encountered in providing its patrons with the quality of comestibles desired, as well as in the quality of the service rendered in their service. One reason for encountering these problems is the large inventory of different comestibles that must be maintained. Another reason is the expense incurred in establishing a kitchen, specifically in connection with the cost of equipment, as well as the cost of maintenance. Of course, one of the more acute problems is the cost of labor, as well as the lack of skill, experience and dependability of the personnel obtained. Other acute problems are waste, spoilage, quality control, price control, administration problems, storage problems, and the like. Of the utmost importance is the time required in preparing the comestibles, and subsequently serving them to the patrons, particularly during the busiest hours. The resulting time delay is annoying to the patron, and disturbing to the restaurateur for reasons that are considered obvious.

These problems are certainly not indigenous to restaurants that serve their patrons on the premises. The "take-out" restaurant or food establishment is fast becoming a huge industry unto its own. This type of establishment is presented with other problems as well. For example, once the food has been prepared, the same must be quickly delivered to the patron so that when the comestibles are ready to be consumed, they are preferably hot, but at the very least warm. Moreover, an establishment of this type will deal with a larger volume of orders since they are usually placed by way of telephone.

Common to each of these establishments, and their problems, is the shape, form or manner in which they receive the comestibles of which an inventory must be maintained. Generally, the problem of storing and maintaining an inventory of comestibles of different types is solved, at least in part, in accordance with the concepts and principles of the art known as "frozen foods." The remaining problems, however, pertain to the package, container or carton in which the frozen comestibles are packaged, shipped, stored, and displayed. Any number of solutions to this problem have been suggested, as for example those that are readily apparent to the average consumer.

The term "frozen foods," therefore, immediately connotes to the average consumer the paperboard package in which a frozen comestible is disposed that, subsequent to its purchase, is stored in the frozen food compartment of a conventional refrigerator. Depending upon whether the comestible has been prepared and only requires heating before serving and consumption, or requires actual preparation, the comestible is removed from the outer paperboard container, and subsequently placed in a heating environment. In one form, the comestibles are contained within a plastic inner package that is removed from an outer container and placed in a pan of boiling water. When the comestible is ready to be served, it is necessary to grasp the bag and sever it at a designated location. This of course is an uncomfortable procedure, if for no other reason than that the user may burn his or her hands. In addition, removal of the contents as well as the liquid is a distasteful chore because of the mess involved, and is uncomfortable to perform because of the degree to which the container and its contents has been heated. Another form is the well known "TV Dinner," comprising an inner pan in which the comestibles are disposed and enclosed by a tin-foil cover disposed within an outer container of paperboard construction. The user removes the inner pan from the outer container and places it in for example a conventional oven. This pan which is constructed generally of a heavier gauge tin-foil must be grasped and the cover removed when the comestibles are ready to be served. Obviously, some protective measure must be taken to preclude burns.

The point is that for each comestible there is a number of solutions. Taking into consideration all of the comestibles that are today frozen in either a prepared or unprepared state, and then made available to the consuming public in retail stores, restaurants, diners, and take-out establishments, so many solutions have been suggested that an even greater number of problems are encountered.

The term "universal" will be used hereinafter in connection with the present invention to define a package, container or carton for frozen comestibles that are either prepared or unprepared, as well as for any other edible or non-edible product. The term is therefore intended to be afforded the broadest possible interpretation, so that when the term "package, container or carton" is used, it will be understood to refer to comestibles of any type or kind, such as meats, vegetables, cheeses, butter, coffee, or the like, as well as to refer to any other edible or non-edible product, as well as to products that require preparation before serving and consumption, or to products that have been prepared, and require only the application of heat before they are ready to be consumed. The term "frozen comestible package, container or carton" may be hereinafter used to facilitate an understanding of this invention, but it will be understood that this term is utilized in an exemplary sense only, and is not in any way intended to be limiting. This same term, namely, "universal," will be used to refer to a container, package or carton for frozen prepared or unprepared comestibles of any type or kind that is constructed and arranged to be utilized as a cooking container in any environment. For example, a universal cooking container constructed in accordance with the principles of this invention may simply be disposed in a pan of boiling water. It may be disposed in an oven as well as being particularly adapted for use in an environment that utilizes high frequency alternating currents such as created by electronic generators of the vacuum tube type for preparing and heating foodstuffs. This type of heating environment may take the form of a conventional "radar" range, electronic heating, radio wave heating, diathermic heating, or dielectric heating.

Having in mind the foregoing, it will be understood that a primary object of the present invention is to provide containers, packages or cartons for comestibles, and for non-edible products as well, and more particularly to means for packaging, shipping, storing and displaying frozen prepared or unprepared comestibles of any kind or type, such as meats, vegetables or the like, said means being constructed and arranged to be universally adapted for use in any heating environment.

Another primary object of this invention, in addition to the foregoing objects, is to provide containers, packages or cartons for comestibles, and for non-edible products as well, and more particularly to means universally usable for packaging, shipping, storing and displaying frozen prepared or unprepared comestibles of any kind or type, said means being constructed and arranged to be easy to handle, and to enable the contents to be removed with facility.

Yet another primary object of the present invention, in addition to the foregoing objects, is to provide containers, packages or cartons for comestibles, and for non-edible products as well, and more particularly to provide means universally usable for packaging, shipping, storing and displaying frozen prepared or unprepared comestibles of any kind or type, said means being constructed and arranged to enable the comestibles, and non-edible products as well, to be disposed therewithin with facility, irrespective of the type of comestible, or non-edible product as well, or its shape or configuration.

A further primary object of this invention, in addition to each of the foregoing objects, is to provide means universally adapted to packaging, shipping, storing and displaying frozen prepared or unprepared comestibles of any kind or type, and for non-edible products as well, said means being constructed and arranged to enable large inventories of such comestibles, and non-edible products as well, to be maintained with facility, to render the display thereof aesthetic, eye-catching, and pleasing, while at the same time enabling their selection by the purchasing public to be readily effected.

A still further primary object of this invention in addition to each of the foregoing objects, is to provide means universally adapted to the packaging, shipping, storing and displaying of frozen prepared or unprepared comestibles of any kind or type, said means being constructed and arranged for unusually efficient use in heating environments that utilize high frequency alternating currents generated by vacuum tubes, as well as in ordinary household heating environments, such as ovens, and the like.

An additional primary object of the present invention, in addition to each of the foregoing objects, is to provide means universally adapted to the packaging, shipping, storing and displaying of frozen prepared or unprepared comestibles of any kind or type, said means being constructed and arranged to preclude the loss of moisture, flavor, or aroma of the comestible product, and non-edible products as well, when thermal energy is being applied thereto, while at the same time being adapted for use as a storage container after the application of little more than ordinary soap and water.

Other objects and important features of the present invention will be apparent from a study of the specification following taken with the drawings, which together show, illustrate, describe and disclose at least one preferred embodiment or modification of the invention, and what is now considered to be the best mode of practicing the principles thereof. Other embodiments or modifications may be suggested to those having the benefits of the teachings herein, and such other embodiments or modifications are intended to be reserved especially as they fall within the scope and spirit of the subjoined claims.

*Description*

In the drawings:

FIG. 1 is an elevational cross-sectional view of a container, package or carton constructed in accordance with the principles of the present invention, disposed in a conventional heating environment;

FIG. 2 is an elevational view of the package, carton or container shown in FIG. 1, but illustrating an other embodiment of a cover or closure therefor and the manner in which it is applied thereto;

FIG. 3 is a cross-sectional view schematically illustrating the construction of the package, container or carton shown in FIG. 1, and certain of the results obtained thereby;

FIG. 4 is a partial elevational view, similar to FIG. 1, but showing a modification of the container, package or carton illustrated therein;

FIG. 5 is a plan view of a modification of the package, carton or container shown in FIGS. 1–4; and FIG. 6 is an elevational view of yet another modification of a container, carton or package constructed in accordance with the principles of this invention.

With reference now to the drawings, and particularly to FIG. 1 thereof, there is illustrated therein a container, carton or package universally adapted to the packaging, shipping, storing and displaying of frozen prepared or unprepared comestibles of any kind or type, and non-edible products as well, generally designated by the reference character 10. The container comprises an upstanding wall 12 that may be of generally annular configuration, and a bottom wall 14. The bottom wall preferably is of concave configuration facing interiorally of the container, for a purpose hereinafter to be described. The construction of the upstanding wall 12 and the bottom wall 14 will be described hereinafter in greater detail. The upstanding wall 12 defines an upper open and unobstructed end or mouth 16 of the container, the upper open or unobstructed end or mouth in turn being defined by an annular bead 18.

A lip, ridge or stand 20 that may be of generally annular configuration extends downwardly from the container 10 at the lower end 22 of the upstanding wall 12. The lip or ridge may be of any suitable construction, and preferably is of the same construction as the upstanding wall, hereinafter to be described. Additionally, the stand 20 may be formed in any suitable manner, and for example, may be formed integrally with the upstanding wall 12 by turning it upon itself as indicated in the drawing at 21. Or, for example, the stand may be formed as a separate element suitably affixed to the container at the lower end 22 of the upstanding wall 12, which will then be shortened accordingly. The lip or ridge 20 comprises a plurality of grooves 24 disposed about the annular extent thereof, although only one such groove is illustrated in elevation. The grooves 24 may be of any suitable configuration, and for example may be triangular in form as illustrated. These grooves define paths of egress from the area defined by and within the annular lip or ridge 20. The bottom wall 14 preferably is fabricated as a separate element and may be heat sealed to the upstanding wall 12 interiorally thereof to insure an air and watertight construction.

With reference now to FIG. 4, wherein like reference characters are used for like parts, with the reference characters being primed, there is therein shown and illustrated another container, package or carton 10', substantially the same as the container, package or carton 10, except for the illustrated modification of the lip or ridge 20'. In this embodiment, and in lieu of the grooves 24, the lip or ridge 20' comprises a plurality of openings 24' which may, for example, be of annular or circular configuration as shown.

As pointed out above, the upstanding wall 12 is as shown in FIG. 1 generally of annular or cylindrical configuration. This is one preferred shape or form of a container constructed in accordance with the principles of this invention, such as the container 10. Another preferred form, shape or configuration is shown in FIG. 5, wherein like reference characters indicate like parts, but wherein the reference characters are primed twice over. In this embodiment, the upstanding wall 12″ is of generally rectangular configuration, to define a container 10″ of the same shape or form. It will therefore be understood that a container constructed in accordance herewith is preferably of cylindrical, rectangular or square configuration, though other configurations may be utilized. For example, the container may be of conical or trapezoidal configuration. In this connection, it will be understood, and it is emphasized, that the dimensions of the container may vary as desired, and in fact a container constructed in accordance herewith may be quite large, both in diameter or length and width, as well as in height or depth.

With continued reference to FIG. 1, and with particular reference now to FIG. 3, it will be seen that the upstanding wall 12 and the bottom wall 14 each comprise three layers of material 26, 28 and 30. With a view towards facilitating an understanding of this invention, the layer 26 will hereinafter be referred to as an inner layer, the layer 28 will hereinafter be referred to as an intermediate layer, and the layer 30 will hereinafter be referred to as an outer layer.

As hereinbefore pointed out, a primary consideration is the loss of moisture, flavor and aroma in preparing unprepared frozen foods for serving and consumption, or only applying heat to frozen prepared foods in order to make them ready for serving and consumption. To preclude the loss of moisture, flavor and aroma, while at the same time providing a container 10 that is universally adapted to the packaging, shipping, storing and displaying of frozen prepared or unprepared comestibles of any kind or type, the outer layer 30 preferably comprises a layer of material defined by a silicone compound or a silicone resin. In order to achieve each and every one of the objects set forth at the outset of the specification, as well as others that will be readily apparent to those skilled in the art, the intermediate layer 28 preferably is fabricated of a material that will enable the presentation of a substantially rigid container. Accordingly, the intermediate layer preferably is fabricated of a non-metallic material capable of rigidity and stability, such as paper, boardstock or other sheet material. The inner layer 26 preferably is fabricated of a film of plastic, such as cellophane, polyethylene, polyethylene-, saran-, or silicone-coated Mylar, or the like.

As clearly illustrated in FIG. 3, the intermediate layer 28, which may for example be fabricated of paperboard, is treated with the outer layer 30 of a silicone compound or silicone resin. This layer of material may be applied directly onto a web of the intermediate layer 28 in any suitable manner, as for example by a roll which administers the volatile silicone resin. Alternatively, the silicone layer 30 can be administered through the medium of a spray or bath, or can be commingled with the material or pulp of which the intermediate layer 28 is fabricated.

The inner layer of material 26, which as pointed out above preferably comprises a plastic film can be extruded on the inner surface of the intermediate layer, and bonded to it through the medium of heated rollers. This may be accomplished in any suitable manner, as for example, by the cylinder manufacturing method. Or, the plastic film 26 may be glued to the intermediate layer 28 by a heat resistant silicone glue. The silicone may be commingled with the pulp from which the layer 28 is fabricated. A silicone-coated plastic (Mylar) may be utilized for the inner layer 26. In this instance, the use of glue is eliminated since the layers 26 and 28 will be bonded through the medium of the affinity of the silicone containing layer 28 and the silicone-coated layer 26 as they are translated through heated rollers. Still further, if desired, the plastic film 26 may be applied to the intermediate layer 28 by a spray or bath.

Silicone is a material that is unusually stable over a wide temperature range, and forms a coating that will not migrate or contaminate, is water repellant, resistant to oxidation, odorless, tasteless, physiologically harmless non-irritant and non-sensitizing. In addition, silicone is a material that provides excellent release from tacky materials. A coating fabricated of this material can be applied to most papers, such as kraft, glassine, parchment, corrugated boxboard and plastic films. In addition, silicone coatings may be colored through the medium of thermally stable pigments that retain their color and gloss at temperatures up to 600 degrees Fahrenheit.

Suitable silicone coating materials for example are manufactured by General Electric Company, Dow-Corning Corporation, The Linde Division of Union Carbide Chemical Corporation, and the like. A fluid consisting of 5% to 7% of a non-volatile silicone resin and a 93-95% volatile alcohol solution, which evaporates quickly, will leave a suitable silicone film. This material is non-gumming, non-carbonizing and resistant to many gases, solids, dilute alkalis and dilute or concentrated acids. It is insoluble in water and its solubility behavior is similar to that of other non-polar liquids. It has a low surface tension and excellent heat transfer properties. It is, in addition, harmless and inert to comestibles, and provides for excellent release from tacky materials, such as candy, or the like.

The use of a silicone coating, therefore, enables the presentation of a container having a fine surface that is hard and glossy. The rigid structure of the container, which results from the choice of materials from which the intermediate layer 28 is fabricated, will not be altered, even though placed in a pan containing boiling water. Nor will the container become "soggy" and soft as a result of contact with the water. However, and this point is emphasized, a silicone coating such as that defined above has excellent transfer properties, insuring a more than adequate and efficient transfer of thermal energy generated by the heating environment.

Again it is emphasized that the construction of a container in accordance herewith that is universally adapted to the packaging, shipping, storing and displaying of frozen prepared and unprepared comestible or non-edible products of any type or kind must be constructed and arranged to preclude the loss of moisture, flavor and aroma. Accordingly, the inner layer 26 preferably is fabricated of a plastic film, for example, cellophane, polyethylene, polyethylene-coated Mylar, or the like. For example, a silicone-coated Mylar film is non-toxic, taste-free and impermeable to water and grease. In addition, a layer of plastic film insures that the container will be airtight, and can be hermetically sealed simply through the medium of a snap-on lid, as will hereinafter be described, or for example, by partially vacuumizing the container to further insure hermetically sealing it due to the application of atmospheric pressure thereto, as will also hereinafter be described. The necessity for applying heat is therefore eliminated. Moreover, materials of this type are flexible at freezing temperatures, for example, zero to 32 degrees Fahrenheit. Nor will a material of this type soften at minimum steam temperatures, such as temperatures at the order of 212 degrees Fahrenheit. In fact, such materials are capable of withstanding temperatures in excess of that figure. It is to be understood, at this point, that the plastic film layer 26 need not essentially be thermoplastic as distinguished from thermosetting.

A container constructed in accordance with the principles of the present invention, therefore, comprises a plurality of layers of material. An outer layer of material is preferably fabricated of a silicone compound or silicone resin which, as clearly illustrated in FIG. 3, will preclude the transfer of water to the intermediate layer 28, but will insure an adequate and efficient degree of thermal energy transfer. An intermediate layer, namely the layer 28, preferably is fabricated of a paper or paperboard material to provide rigidity and stability, particularly with a view towards packaging, shipping, storage, display, handling, opening, and subsequent use. The inside or interior layer of material, namely, the layer 26, is preferably fabricated of a plastic film, thus rendering the container airtight and capable of being hermetically sealed without the application of heat. A container constructed in accordance herewith is thus capable of universal application in the sense that frozen comestibles can be packaged, shipped, stored and displayed therein, and in addition can be prepared or heated therein. Moreover, a container constructed in accordance herewith is universally adapted to any method of generating an environment of thermal energy, irrespective of whether this environment is generated through the medium of high frequency alternating currents, such as a conventional "radar" range, or conventional applications found in the home, such as ovens, and the ordinary pan or pressure cooker containing boiling water.

In connection with the latter, and reference again to FIGS. 1 and 4, there is shown therein a pan 32, 32′ in which water 34, 34′ is placed for cooking or heating purposes. A certain portion of the water will be disposed within the area or confines defined by the bottom wall 14 and the stand 20, 20′. As the water is heated, it tends to expand as is considered readily apparent. In the absence of any provision to the contrary, the expanding heated water may tend to disrupt the condition of stability or "tilt" the container with respect to the pan. As pointed out above, however, the grooves 24 or the apertures 24′ provide a path of egress from the area. It is considered readily apparent that the level of water within this area will rise no higher than the lower end 22 of the upstanding wall 12. It has been found that by fabricating the bottom wall 14 of concave(interior)-convex(exterior) configuration, to define a space 36, 36′ below the bottom of the wall, and by providing the grooves 24 and the apertures 24′, this condition of stability of the container relative to the pan will be maintained.

As also hereinbefore pointed out, use of an inner layer 26 fabricated of a plastic film provides an airtight container enabling an hermetic seal to be achieved. The container 10, 10′, 10″ therefore further comprises a closure or cap 38 adapted to be hermetically sealed relative to the container, and particularly at the open and unobstructed end or mouth 16 thereof defined by the annular bead 18. The container, at the mouth 16, is constructed and arranged to provide an annular inwardly tapering wall 40 extending from the annular bead 18 to an inwardly extending annular ridge or projection 42. The container is further constructed and arranged to define an annular recess or groove 44.

The closure or cap 38 itself comprises an annular wall or closure portion 46. The wall or closure portion 46 may be fabricated of any suitable material and in any suitable manner, but preferably is fabricated, as is the whole of the closure or cap 38, substantially the same as the upstanding wall 12. In addition to an outer and intermediate layer, therefore, the closure 38, and in particular the wall or closure portion 46 comprises an inner layer 48 which preferably is fabricated of a film of plastic, such as cellophane, polyethylene, polyethylene-, saran-, or silicone-coated Mylar, or the like.

The closure or cap 38 is of similar configuration with respect to the container 10 itself to define an annular inwardly tapered wall 50 which is turned upon itself as indicated at 52 to define an annular lip 54. When the closure or cap 38 is in a closed position relative to the container 10, the wall 50 is adapted to be positioned upon the interior surface of the wall 40 of the container, and the lip 54 adapted to be disposed in firm sealing engagement with the exterior surface of that wall. The bead 18 of the container is adapted to be disposed within the recess defined by turning the wall 50 upon itself, as pointed out above.

The closure or cap 38 further comprises an annular recess or groove 56 which is particularly adapted to cooperate with the rib or projection 42, and an annular rib or projection 58 adapted to cooperate with the recess 44 of the container 10.

It will now be understood that the rib or projection 58 is adapted to be "snapped" past the rib or projection 42 of the container and into the recess 44. Similarly, the rib or projection 42 will be "snapped" past the rib or projection 58 into the recess or groove 56 of the closure 38. In the closed position of the closure, as pointed out above, the inwardly tapered wall 50 will be positioned upon the wall 40 of the container, and the annular lip 54 disposed in firm sealing engagement with the exterior surface of that wall. In this connection, the dimensions of the recess defined by turning the wall 50 upon itself as indicated at 52 should be chosen to insure this firm sealing engagement between the lip 54 and the wall 40.

The closure or cap 38 further comprises a vent means defined by a substantial plurality of scores or indentations 60 provided upon on and about the peripheral lip 54. Accordingly, if the pressure in the container 10, 10′ becomes excessive, as for example due to the development of vapor or expansion of a comestible product designated in FIG. 1 by the reference character 62, the increased pressure will be allowed to "bleed" or escape through a passage defined by and between the exterior surface of the wall 40 and the peripheral lip 54 about the bead 18. This is true since the scores or indentations 60 will enable the lip to flex. The closure or cap 38 may therefore be said to comprise a safety valve that precludes "explosion" of the container and its contents, namely, the comestibles 62 for example shown in FIG. 1.

With particular reference to FIG. 2, a modification of the closure or cap generally designated by the reference character 38′ is illustrated therein. In this instance, the container 10′ comprises an outwardly extending annular rib or projection 64 in addition to the annular bead 18′. The wall (not shown) of the container extending between the bead 18′ and the rib or projection 64′ is generally vertically disposed, rather than being inwardly tapered as is the wall 40 shown in FIG. 1. The container 10′ may therefore be said to comprise the annular bead 18′ and an interiorly disposed outwardly extending annular recess or groove defined by the rib or projection 64.

The closure or cap 38′ is similar to the closure 38. However, the wall 50′ is generally vertically disposed, and is adapted to be positioned against the interior surface of the vertical wall extending between the bead 18′ and the rib 64. The wall 50′ is turned upon itself to define the peripheral lip 54′ and a recess, as indicated at 52′. The dimensions are once against chosen to insure the peripheral lip 54′ will be disposed in firm sealing engagement with the exterior surface of the wall extending between the bead 18′ and the rib 64.

The closure or cap 38′, like its counterpart 38, comprises an annular rib or projection 58′ adapted to be positioned within the annular recess or groove defined by the rib or projection 64.

In the packaging of a frozen prepared or unprepared comestible, which is designated in FIG. 1 by the reference character 62, the same is disposed or placed within the container 10 to approximately two-thirds of its capacity if the comestible is moisture-laden. If the comestible is not of the type that contains moisture, or will not be heated, the container may be substantially completely filled with the product. Alternatively to the "snap-on" relationship between the closure 38 and the container 10 in FIG. 1, the closure 38′ and container 10′ are particularly adapted to insure an hermetic seal of the latter through the medium of atmospheric pressure. Thus, after the product has been placed within the container, the latter and the closure 38' may be placed in a sealed chamber maintained at a reduced pressure or vacuum. The cover or closure is then advanced towards the container, and positioned to dispose the annular rib or projection 58' within the recess or groove defined by the rib 64, and the bead 18' within the recess defined by turning the wall 50' upon itself, as indicated at 52'. The peripheral lip 54' will then be disposed in intimate and firm sealing engagement with the outer surface of the vertical wall extending between the bead 18' and the rib 64. In this position, the vacuum in the chamber is then broken thereby admitting atmospheric pressure into the container 10'. However, due to the sealing engagement between the peripheral lip 54' and the exterior surface of the aforesaid wall, the reduced pressure or vacuum within the container 10' will be maintained. The greater atmospheric pressure forces the peripheral lip 54' into intimate sealing contact completely about the bead 18'. This intimate engaging and sealing contact is thereafter maintained by the force of the ambient, atmospheric pressure.

With particular reference now to FIG. 6, wherein like reference characters indicate like parts, but wherein the reference characters are primed thrice over, there is illustrated therein another modification of a container constructed in accordance herewith, and hereinbefore described. The container 10''' comprises a stand 20''', and a snap-on cover or closure 38''' constructed and arranged to "bleed" or enable the escape of pressure that builds up excessively within the container. The container 10''' is merely exemplary, therefore, of another shape or configuration which a container constructed in accordance herewith may take, the container 10''' in all other respects being substantially of the same construction as the container 10, 10' or 10''.

In accordance with the foregoing, therefore, it will be understood that each and every one of the objects set forth at the outset of this specification can be successfully attained by a container constructed in accordance herewith. It is again emphasized that such a container is "universally" adapted to the packaging, shipping, storing and displaying of frozen prepared and unprepared comestibles or any other edible or non-edible products of any type or kind, such as meats, vegetables, or the like. This is true with respect to comestibles or any other edible or non-edible products of any type, kind or dimension that are packaged and shipped to conventional retail outlets where they are stored and displayed for purchase by the consuming public, and subsequent use in the home. A container constructed in accordance herewith is equally as well adapted to the packaging of frozen prepared or unprepared comestibles of any type or kind or dimension that are subsequently shipped to restaurants or "take-out" establishments where an inventory of such comestibles is maintained for subsequent use in accordance with the demand. Thus, comestibles of all types, kinds, shapes and sizes, in a prepared or unprepared state, can be frozen and then subjected to an environment generating thermal energy irrespective of whether this environment is defined by a conventional pan containing boiling water, or high frequency alternating currents, such as a conventional "radar" range. Patrons in restaurants will therefore be served more rapidly, will have a far greater choice of comestibles, and will receive the service desired. The same is true with respect to such establishments specializing in "take-out" food. By the same token, the restaurateur or owner will be able to store a greater variety of comestibles, will be able to eliminate waste, spoilage and many administrative problems, and in general will be able to operate an establishment on a far more economical basis. In effect, an establishment requiring a large staff, can be turned into a "one-man" operation.

While the invention has been shown, illustrated, described and disclosed in terms of embodiments or modifications which it may assume in practice, the scope of the invention should not be deemed to be limited by the precise embodiments or modifications herein shown, illustrated, described or disclosed, such other embodiments or modifications intended to be reserved especially as they fall within the scope of the claims here appended.

What is claimed is:

1. Container, package or carton structure universally adapted to the packaging, shipping, storing and displaying of frozen prepared and unprepared comestibles and other edible as well as non-edible products irrespective of their kind or type, and of their size, shape, configuration and dimensions, comprising a body portion defining an upper open and unobstructed end or mouth, a bottom wall, a stand, and a cap or closure adapted to be disposed in hermetically sealing relationship with said container at the mouth thereof, said body portion and bottom wall being fabricated of a plurality of layers of electrically non-responsive material chosen to enable the comestibles to retain their moisture, flavor and aroma irrespective of the heat-generating environment in which comestibles are placed to be made ready for serving and consumption, such as moisture-laden atmospheres, one in which the heat is generated by high frequency alternating currents, or the like, wherein one of said layers of material is a heat transfer material comprising a moisture barrier selected from the group consisting of water insoluble silicone compounds and silicone resins.

2. Container, package or carton structure as defined in claim 1, wherein one of said layers of material is a heat transfer material comprising a moisture barrier selected from the group consisting of water insoluble silicone compounds and silicone resins, another layer of material is a rigid and stable material selected from the group consisting of paper, boardstock, kraft, glassine, parchment, corrugated boxboard, and sheet materials, and a third layer of material is an air-tight material subject to being hermetically sealed selected from the group consisting of thermoplastic and thermosetting plastics.

3. Container, package or carton structure universally adapted to the packaging, shipping, storing and displaying of frozen prepared and unprepared comestibles and other edible as well as non-edible products irrespective of their kind or type, and of their size, shape, configuration and dimensions, comprising a body portion defining an upper open and unobstructed end or mouth, a bottom wall, a stand, and a cap or closure adapted to be disposed in hermetically sealing relationship with said container at the mouth thereof, said body portion and bottom wall being fabricated of a plurality of layers of electrically non-responsive material chosen to enable the comestibles to retain their moisture, flavor and aroma irrespective of the heat-generating environment in which comestibles are placed to be made ready for serving and consumption, such as moisture-laden atmospheres, one in which the heat is generated by high frequency alternating currents, or the like, wherein one of said layers of materials is an air-tight material enabling said container, package or carton structure to be hermetically sealed subsequent to vacuumizing at least partially selected from the group consisting of thermoplastic and thermosetting plastics, wherein said container further comprises a bead disposed at the open and unobstructed end or mouth thereof, and wherein said closure or cap is constructed and arranged to hermetically seal said container through the medium of ambient, atmospheric pressure subsequent to at least partially vacuumizing said container, said closure comprising a lip adapted to be disposed in a firm and intimate sealing engagement with a wall disposed adjacent the bead of said container, wherein said cap or closure further comprises vent means defined by a plurality of scores or indentations positioned about the periphery of said lip.

4. Container, package or carton structure as defined in claim 2 wherein said bottom wall is of generally concave configuration interiorly of the container to define a space below the convex exterior surface of said bottom wall and wherein said stand comprises a plurality of paths of egress from said space.

5. Container, package or carton structure as defined in claim 4 wherein said paths of egress are defined by openings extending through said stand at least adjacent the under peripheral edge portion of said bottom wall.

6. Container, package or carton structure as defined in claim 4 wherein said container further comprises a bead disposed at the open and unobstructed end or mouth thereof, and wherein said closure or cap is constructed and arranged to enable hermetic sealing of said container, such closure comprising a lip adapted to be disposed in firm and intimate sealing engagement with a wall of said container disposed adjacent the bead thereof.

7. Container, package or carton structure as defined in claim 6 wherein said cap or closure further comprises vent means defined by a plurality of scores or indentations positioned about the periphery of said lip.

8. Non-metallic, air and moisture impervious, heat pervious and rigid container, package or carton structure utilizable with edible and non-edible products comprising, in combination, a wall portion fabricated of at least two layers of electrically non-responsive material, at least the outer layer being moisture impervious and at least the inner layer being air impervious, enabling shipping, storing, displaying and heating of the packaged product contained therewithin by substantially any means, such as by immersion in hot liquid, gas, or combination thereof, or by exposure to radiation, electromagnetic energy, electrical fields, or the like, further comprising at least one additional layer comprising, in turn, a rigid and stable material selected from the group consisting of paper, boardstock, craft, glassine, parchment, corrugated boxboard, and electrically non-responsive sheet materials.

9. Container, package or carton structure as defined in claim 8 wherein said outer layer comprises a heat transfer material selected from the group consisting of water insolubles, silicone compounds and silicone resins.

10. Container, package or carton structure as defined in claim 8 wherein said inner of said layers comprises a film material selected from the group consisting of thermoplastic and thermosetting plastics.

11. Container, package or carton structure as defined in claim 8 further comprising a bottom wall of generally concave configuration interiorly of the container and non-metallic stand means extending generally downwardly of said bottom wall, said stand means and said bottom wall together defining a space, said stand comprising a plurality of paths of egress from said space.

References Cited
UNITED STATES PATENTS

| | | | |
|---|---|---|---|
| 2,223,240 | 11/1940 | Hughes | 229—3.5 |
| 2,555,380 | 6/1951 | Stuart et al. | 229—3.5 |
| 2,970,736 | 2/1961 | Baughan | 229—3.5 |

DAVID M. BOCKENEK, *Primary Examiner.*